United States Patent [19]

Sakakibara et al.

[11] 4,169,053

[45] Sep. 25, 1979

[54] METHOD OF TREATING WASTE WATERS CONTAINING SOLID-PHASE DIFFICULTLY-SOLUBLE COMPOUNDS

[75] Inventors: Naotaka Sakakibara; Shigeru Ohno; Shigeki Shimizu, all of Tokyo, Japan

[73] Assignee: Nippon Electric Co., Ltd., Tokyo, Japan

[21] Appl. No.: 866,416

[22] Filed: Jan. 3, 1978

Related U.S. Application Data

[63] Continuation of Ser. No. 712,323, Aug. 6, 1976, abandoned.

[30] Foreign Application Priority Data

Aug. 8, 1975 [JP] Japan .................... 50-96521

[51] Int. Cl.$^2$ ................... C02B 1/20; C02C 5/02
[52] U.S. Cl. ................... 210/49; 75/109; 210/52; 210/56; 210/DIG. 30; 423/142; 423/594
[58] Field of Search ............ 75/109; 210/42 R, 50-53, 210/56, 10, 49, DIG. 30; 423/142, 594, 632, 633

[56] References Cited

U.S. PATENT DOCUMENTS

| | | | |
|---|---|---|---|
| 3,428,416 | 2/1969 | Gie et al. | 423/594 |
| 3,686,347 | 8/1972 | Dean et al. | 423/594 |
| 3,752,759 | 8/1973 | Burg et al. | 210/50 |
| 3,887,479 | 6/1975 | McLain | 423/594 |
| 3,931,007 | 1/1976 | Sugano et al. | 210/52 |

FOREIGN PATENT DOCUMENTS

| | | | |
|---|---|---|---|
| 1125365 | 3/1962 | Fed. Rep. of Germany | 210/51 |
| 7202085 | 8/1972 | Netherlands | 423/594 |
| 1380721 | 1/1975 | United Kingdom | 423/594 |

*Primary Examiner*—Charles N. Hart
*Assistant Examiner*—Peter A. Hruskoci
*Attorney, Agent, or Firm*—Hopgood, Calimafde, Kalil, Blaustein and Lieberman

[57] ABSTRACT

A method is provided for treating waste water containing solids of difficultly-soluble compounds of at least one heavy metal, the method comprising the steps of adding an amount of ferrous ions to said waste water corresponding on a molar basis to about 2 to 100 times the total molar amount of heavy metal present in said waste water, adding an alkaline substance to said waste water in an amount corresponding to about 0.9 to 1.2 equivalent of free acid present in said waste water, and stirring the waste water without aeration at a temperature of at least about 40° C., whereby insoluble ferrite crystals are precipitated having said heavy metal incorporated therein.

9 Claims, No Drawings

METHOD OF TREATING WASTE WATERS CONTAINING SOLID-PHASE DIFFICULTLY-SOLUBLE COMPOUNDS

This is a continuation of copending application Ser. No. 712,323 filed Aug. 6, 1976 now abandoned.

The present invention relates to methods for treating waste waters containing difficultly-soluble compounds present as solids in waste water, and particularly to methods of removing heavy metals contained in such difficultly-soluble solids contained in both the solid compounds and the waste water obtained therefrom.

STATE OF THE ART

Examples of waste waters include those resulting from washing or scrubbing residual ashes following incineration of municipal refuse or the like; those resulting from the wash-out or scrubbing of smoke from furnaces or incinerators; and those resulting from wash-out or scrubbing of fly-ashes discharged from electric precipitators, multicyclones or the like. Such waste waters also include those containing hydroxides precipitated by means of the conventional neutralization precipitation process of waste waters containing precipitable heavy metal ions, and wet sludges of hydroxides of heavy metals, such as separated from waters subjected to the foregoing type of neutralization precipitating process.

The aforementioned waste waters from the scrubbing of residual ashes, smoke, or fly-ashes contain suspended and/or precipitated solid-phase substances, including silica, carbon and its derivatives, difficultly-soluble inorganic compounds of heavy metals, as well as dissolved heavy metal ions. The difficultly-soluble inorganic compounds which may be present originally as a suspension and/or formed by precipitation in such waste waters include metallic oxides, such as copper oxide, lead oxide and mercury oxide; carbonates, such as copper carbonate, lead carbonate and manganese carbonate; sulfates, such as lead sulfate; and chlorides, such as mercury chloride.

These waste waters have heretofore been treated by the neutralization-precipitating method whereby dissolved heavy metal ions are precipitated as hydroxides by adding an alkaline substance, together with the foregoing solid-phase substances, and the solids containing the heavy metal ions then separated and removed from the waste water. The treated waste water is then discharged. Most heavy metal hydroxides as solids are substantially insoluble into water in general; but heavy metals may often be redissolved from the hydroxide sludges at certain specific pH values of the environment and thus increase the possibility of causing secondary pollution. Secondary pollution may also be caused by similar redissolution of heavy metals from solids of difficultly-soluble heavy metal salts originally in the form of suspensions and/or formed by precipitation in waste waters, the solids being thereafter separated therefrom together with the hydroxides.

A known method for treating waste waters containing heavy metal ions with little or no suspension of solids and/or precipitates comprises adjusting the pH values of the waters to precipitate hydroxides of the heavy metals which are then separated from the waste waters. However, such separated heavy metal hydroxides may similarly cause secondary pollution by partial redissolution of the heavy metals. To solve this problem, a method has been proposed in which sludges of heavy metal hydroxides or other solids of difficultly-soluble heavy metal compounds are incorporated in cement to form blocks before discharge. This approach, however, has not been fully perfected. At present, the recycling of heavy metal hydroxides is hardly used on an industrial basis and, generally speaking, they are discarded without being recycled.

OBJECTS OF THE INVENTION

It is therefore an object of the present invention to provide a method of efficiently treating waste waters containing difficultly-soluble compounds present in the form of solids.

Another object of the invention is to provide a method of treating heavy metal hydroxides present as precipitates in waste waters or in the form of sludges separated from waste waters in order to inhibit or prevent redissolution of said heavy metal-containing hydroxides or sludges.

STATEMENT OF THE INVENTION

The method in accordance with the invention is characterized in that heavy metal hydroxides or other difficultly-soluble, solid-phase heavy metal compounds (i.e. heavy metal-containing solids) are converted into ferrites which are insoluble, thus putting the heavy metals in insoluble form and permitting the resultant compounds to be recycled while substantially avoiding secondary pollution.

According to one embodiment of the invention, ferrous ions are added to waste water containing difficultly-soluble heavy metal compounds present as solids, the amount of ferrous ions added being 2 to 100 times on the molar basis greater than the amount of the heavy metals present in the waste water. An alkaline substance or an aqueous solution thereof is added to the waste water, the amount of alkaline substance (e.g. sodium hydroxide) or its aqueous solution corresponding to approximately one chemical equivalent, or a chemical equivalent preferably ranging from about 0.9 to 1.2, based on the free acid present in the waste water. The waste water is then heated to a temperature above 40° C. and stirred without passing air or using any oxidizing agent at a temperature maintained at or above 40° C. Thus, the heavy metal ions present in the solids or the difficultly-soluble compounds are incorporated into the crystal lattice of the ferrite crystals formed during the treatment, thereby eventually forming a precipitate of ferrite crystal particles containing said heavy metal ions. Where heavy metal ions are present as free ions together with solid-phase heavy metal compounds in the waste water to be treated according to the invention, these free heavy metal ions are also incorporated into the precipitated ferrite crystals and hence extracted from the waste water. Difficultly-soluble heavy metal compounds contained as solid substances or solids in the waste water to be treated according to the invention include at least one of the oxides, carbonates, sulfates, chlorides, or hydroxides of heavy metals, such as Pb, Cu, Ti, Cr, Mn, Co, Ni, Zn, Cd, Sn, Hg, or Bi. It is also possible according to the invention to treat waste waters containing dissolved heavy metal ions with solids present e.g. difficultly-soluble heavy metal compounds, by adjusting the pH value of the waste water to effect precipitation of heavy metal hydroxides, adding an amount of ferrous ions corresponding on a molar basis to about 2 to 100 times the total molar amount of all heavy metal ions present in any form in the waste water, followed by adding alkali (e.g. alkali metal hydroxide) in an amount corresponding to about 0.9 to 1.2 equivalent of the free acid present in the waste water, and then stirring the waste water without aeration at a temperature at and preferably above 40° C. to effect precipitation of ferrite crystals having incorporated therein heavy metal ions originally present in the waste water. Sludges of heavy metal hydroxides can be treated by the invention by adding thereto a ferrous salt, such as ferrous sulfate or ferrous chloride, preferably in the form of an aqueous solution, in an amount corresponding on a molar basis to about 2 to 100 times of the total molar amount of the heavy metals in the sludge adding thereto an alkali, preferably in the form of an aqueous solution (e.g. sodium hydroxide), in an amount corresponding to about 0.9 to 1.2 equivalent of free acid present, and stirring the mixture at a temperature of at least or over 40° C. without aeration to convert the hydroxides into ferrite crystals having incorporated therein said heavy metals.

The ferrites incorporating toxic heavy metals according to the invention are not soluble in water and thus, substantially avoid secondary pollution in water. Furthermore, because ferrite is a ferromagnetic substance, the ferrite precipitate with the associated toxic wastes can be recycled for use as the material for ferrite magnets, electromagnetic wave-absorbing materials, and other magnetic materials. In other words, the method of this invention is highly advantageous in recycling wastes for forming useful products. Among heavy metals which can readily be incorporated into ferrites according to the invention are Mn and Zn, in a ratio of about 33% to Fe on a molar basis. Thus, by adding $Fe^{++}$ ions to waste water in an amount in mols at least twice the amount of heavy metals contained in the waste water, these heavy metals are taken into the ferrite crystals and thereby permit the heavy metals to be extracted from the waste water. It is somewhat difficult to incorporate a large amount of Hg, Pb, or the like into ferrites, but these elements can still be incorporated into ferrites in a ratio on the molar basis of up to about 1% to Fe. Accordingly, to extract these heavy metals, the amount of Fe ions to be added to the waste water is preferably 100 times on the molar basis of the total amount of heavy metals contained therein.

In general, the foregoing difficultly-soluble heavy metal compounds exhibit low solubility, and hence the rate of ferrite formation for them is quite slow. Thus, the time necessary for treating waste waters tends to be prolonged. To reduce the treating time, it is desirable to enhance the solubility of the difficultly-soluble compounds. To accomplish this, the temperature of the waste water is raised during the ferrite formation reaction to promote the reaction. At a temperature of at least or above 40° C., the desired effect is obtained. Preferably, the waste water is maintained at a temperature below about 95° C., or in the range of about 60 to 80° C. If the waste water is stirred with aeration in the process of ferrite formation reaction, the ferrous ions are oxidized excessively into ferric ions, hampering normal ferrite formation reaction. For ferrite formation reaction from difficultly-soluble compounds of low solubility, therefore, the waste water must be stirred under non-aeration conditions.

DETAILS OF THE INVENTION

The invention will be described in more detail by way of the following examples:

EXAMPLE 1

The waste water was wash water employed in the washing or scrubbing of residual ashes discharged from a municipal refuse disposal plant and of fly-ashes from electric precipitators and multicyclones. The waste water had a pH of 6.1 and contained dissolved heavy metals at a total concentration of about 50 ppm and suspended solids of heavy metal compounds, excluding suspended substances of sulfuric acid and its derivatives and carbon and its derivatives, at a concentration of about 1200 ppm. Ferrous sulfate was added to the waste water in a ratio of 15 kg per cubic meter of the waste water, which was stirred and then neutralized by adding sodium hydroxide thereto. The waste water was then heated to a temperature of 60° C. and stirred by a low speed stirrer at 60° C. for 6 hours, which resulted in a black ferromagnetic precipitate of ferrite. After the reaction process was completed, the waste water was passed through a magnetic separator to separate the precipitate from the liquid. The resultant waster was a colorless, transparent liquid in which no solid-phase substances, such as suspended solids were observed. The initial waste water before treatment and the water after treatment were sampled and analyzed. The analyzed results are shown in the following table. Also shown are results of tests on the dissolution of heavy metals from the precipitates in water. The analysis of metal ions contents or concentration in the water was carried out by the atomic absorption spectrophotometric method.

| Kind of Heavy Metal | Metal Contents in Waste Water | | Metal Dissolution From Precipitates |
|---|---|---|---|
| | Before Treatment | After Treatment | |
| | (ppm) | (ppm) | (ppm) |
| Cd | 1.12 | 0.001 | less than 0.001 |
| Pb | 5.38 | less than 0.03 | less than 0.03 |
| Zn | 41.0 | less than 0.005 | less than 0.005 |
| Ni | 0.34 | 0.03 | 0.016 |
| Cu | 2.01 | 0.006 | less than 0.006 |
| Mn | 2.21 | less than 0.005 | less than 0.005 |
| Suspended Substances | 1200 | less than 1 | |

As will be noted, the precipitates produced in accordance with the invention are substantially insoluble.

EXAMPLE 2

The waste water described in Example 1 was treated by neutralizing with sodium hydroxide to provide an alkaline to acid equivalent of about 1 and the precipitated heavy metal hydroxides were allowed to settle together with suspended solids and separated as a sludge. The water content in the resultant sludge was 97% and the pH value thereof was about 10.2. The sludge was sampled to an amount of 1 kg which was placed in a ball mill of about 3 liter capacity. Then, 0.36 kg of ferrous sulfate in solid phase and 0.12 kg of sodium hydroxide in solid phase were added to the sample. The ball mill was heated to a temperature of about 65° C., and the sample was stirred for 10 hours at this temperature. As a result of the foregoing treatment, a black, ferromagnetic ferrite precipitate was obtained. After the reaction, and sludge-containing water was passed through a press filter and a solidified sludge or cake was obtained. The test on dissolution of heavy metals from the sludge was carried out by the same method as used in Example 1. The results are tabulated below.

| Kind of Heavy Metal | Metal Dissolution From Sludge |
|---|---|
| | (ppm) |
| Cd | less than 0.001 |
| Pb | less than 0.03 |
| Zn | 0.05 |
| Ni | 0.03 |
| Cu | less than 0.02 |
| Mn | 0.008 |

According to the invention, as described above, difficultly-soluble compounds are converted into ferrite compounds by chemical reaction, whereby the hard-soluble compounds can be transformed into stabilized insoluble compounds and can thus be effectively and usefully recycled. Although the disclosed method needs a longer treatment time than known methods in general, the method of the invention permits the sludge to be readily recycled in many ways, as opposed to other prior art methods.

As disclosed in the examples, sodium hydroxide is preferably used as the alkaline substance for neutralizing the acid. According to the invention, other basic substances, such as hydroxides of alkali metals and alkaline earth metals may be used in place of sodium hydroxide, depending on reaction conditions chosen and the economics of the process. In the disclosed examples, ferrous sulfate is used as ferrous salt. Instead, other ferrous salts may be used. From the viewpoint of economy and effective recycling of industrial wastes, it is desirable that ferrous chloride or ferrous sulfate be used because these materials are available as by-products produced in pickling of iron sheets or in the production of titanium oxide. In treating waste water which already contains a sufficient amount of ferrous salt, the amount of addition of ferrous salt is accordingly adjusted or reduced to zero. For weak alkaline waste waters, the amount of alkali addition may be adjusted according to the amount of ferrous salt added, the ferrous salt forming acid by hydrolysis. For strong alkaline waste waters, the alkali addition may be omitted.

As stated hereinbefore, the waste water is adjusted with an alkaline substance to provide a pH corresponding to about 0.9 to 1.2 equivalent of free acid present. The foregoing range corresponds generally to a pH of about 7 to 13.

Although the present invention has been described in conjunction with preferred embodiments, it is to be understood that modifications and variations may be resorted to without departing from the spirit and scope of the invention as those skilled in the art will readily understood. Such modifications and variations are considered to be within the purview and scope of the invention and the appended claims.

We claim:

1. A method of treating waste water containing solids of difficultly-soluble compounds selected from the group consisting of oxides, carbonates, sulfates, chlorides and hydroxides of at least one heavy metal, comprising the steps of adding an amount of ferrous ions to said waste water corresponding on a molar basis to about 2 to 100 times the total molar amount of heavy metal present in said waste water, adding an alkali metal hydroxide to said waste water in an amount corresponding to about 0.9 to 1.2 equivalent of free-acid present in said waste water and stirring the waste water under conditions without passing air and without adding an oxidizing agent to said waste water for a time sufficient to incorporate heavy metal ions present in said at least one compound into ferrite crystals formed during stirring at a temperature of about 40° C. to 95° C., and separating said ferrite crystals from said waste water.

2. The method of claim 1 wherein said at least one heavy metal is selected from the group consisting of Pb, Cu, Ti, Cr, Mn, Co, Ni, Zn, Cd, Sn, Hg and Bi.

3. The method of claim 1 in which said waste water is maintained at a temperature between 60° C. and 80° C. during said stirring step.

4. A method of treating waste water containing precipitated hydroxides of at least one heavy metal ion, comprising the steps of adding an amount of ferrous ions to said waste water corresponding on a molar basis to about 2 to 100 times the total molar amount of said at least one heavy metal present, adding an alkali metal hydroxide to said waste water in an amount corresponding to about 0.9 to 1.2 equivalent of free acid present in said waste water, stirring said waste water under conditions without passing air and without adding an oxidizing agent to said waste water for a time sufficient to incorporate said at least one heavy metal ion into ferrite crystals formed during stirring at a temperature of about 40° C. to 95° C., and separating said ferrite crystals from said waste water.

5. The method of claim 4, wherein said at least one heavy metal ion is selected from the group consisting of Pb, Cu, Ti, Cr, Mb, Co, Ni, Zn, Cd, Sn, Hg and Bi.

6. The method of claim 4, in which said waste water is maintained at a temperatue of 60° C. to 80° C. during said stirring step.

7. A method of treating hydroxide sludge of at least one heavy metal ion comprising the steps of adding an amount of ferrous salt to the sludge of hydroxides of said at least one heavy metal ion, the amount of ferrous ions in said ferrous salt corresponding on a molar basis to about 2 to 100 times of the total molar amount of said at least one heavy metal present in said sludge, adding an alkali metal hydroxide to the mixture in an amount corresponding to about 0.9 to 1.2 equivalent of free acid present in the mixture, stirring said mixture under conditions without passing air and without adding an oxidizing agent to said waste water for a time sufficient to incorporate said at least one heavy metal ion into ferrite crystals formed during stirring at a temperature of at least about 40° C. to 95° C., and then extracting said ferrite crystals therefrom.

8. The method of claim 7, wherein said at least one heavy metal ion is selected from the group consisting of Pb, Cu, Ti, Cr, Mn, Co, Ni, Zn, Cd, Sn, Hg and Bi.

9. The method of claim 7, in which said waste water is maintained at a temperature of between 60° C. to 80° C. during said stirring step.

* * * * *